United States Patent [19]

Boone

[11] 4,269,096

[45] May 26, 1981

[54] PORTABLE WORKSTAND

[76] Inventor: Harold B. Boone, R.R. #2, Box 767, Mulvane, Kans. 67110

[21] Appl. No.: 67,755

[22] Filed: Aug. 20, 1979

[51] Int. Cl.³ .......................... B23D 47/02; B62B 1/20
[52] U.S. Cl. ...................................... 83/477.2; 83/701; 83/928; 51/166 TS; 108/18; 144/286 A; 188/24; 248/129; 280/30; 280/655; 280/43.24
[58] Field of Search ........... 51/166 R, 166 TS, 170 R; 83/477.2, 574, 701, 928; 108/18, 19, 113; 144/286 A, 286 R; 248/129; 280/30, 35, 43.17, 43.24, 641, 643, 655; 408/77, 78; 409/175; 188/24

[56] References Cited

U.S. PATENT DOCUMENTS

| 2,662,566 | 12/1953 | Kurschner | 144/286 R |
| 2,928,439 | 3/1960 | Tester | 83/928 X |
| 2,993,740 | 7/1961 | Good | 108/80 |
| 3,188,418 | 6/1965 | Pino | 188/24 X |
| 3,404,884 | 10/1968 | Sorenson et al. | 280/43 X |
| 3,595,115 | 7/1971 | Pelletier | 83/701 X |

FOREIGN PATENT DOCUMENTS 2254411 7/1975 France .................................. 144/286 A Primary Examiner—Frank T. Yost
Assistant Examiner—Robert P. Olszewski
Attorney, Agent, or Firm—Robert E. Breidenthal

[57] ABSTRACT

A portable workstand for power tools and the like which is convertible from a tool utilization condition to a portable condition wherein a wheel and a pair of handles extend therefrom for wheelbarrow-like portability. The handles are connected to the wheel in an arrangement such that pivotal movement of the handles from unextended and depending positions to their extended positions moves the wheel from a retracted position within a cavity in the stand to its extended position. A hand brake for the wheel is provided and provision is also made for releasably retaining the handles in their extended positions against inadvertent movement therefrom.

12 Claims, 6 Drawing Figures

U.S. Patent May 26, 1981 Sheet 2 of 2 4,269,096
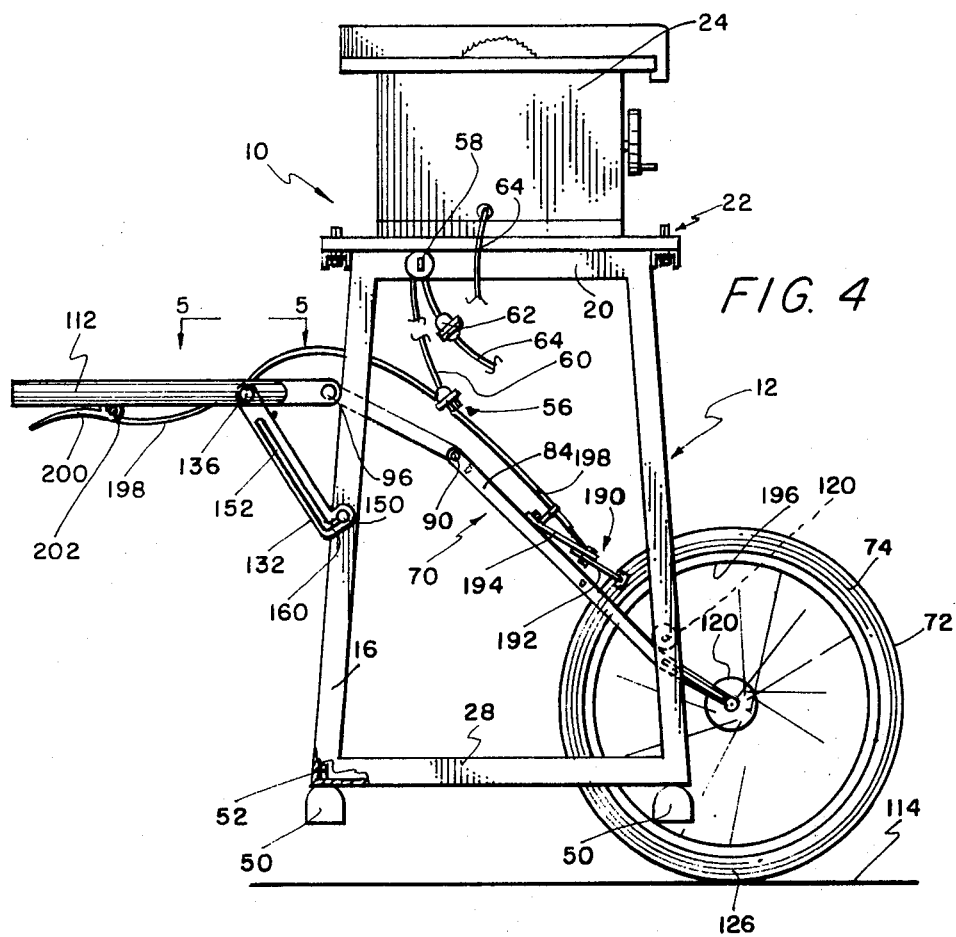
FIG. 4
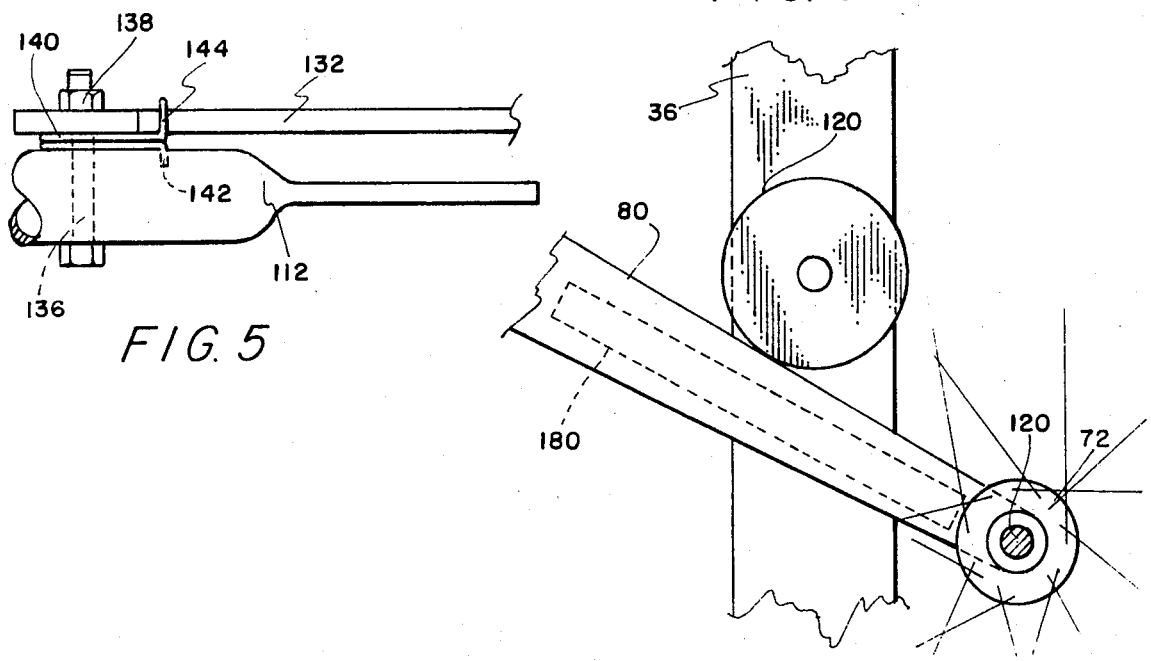
FIG. 5
FIG. 6

PORTABLE WORKSTAND

The present invention relates to new and useful improvements in portable workstands such that the user can, with minimum strain, manually move the stand from one position of utilization to another, and more specifically the present invention pertains to such a portable stand wherein movement of a pair of handles from unextended positions to extended positions thereof retracted within the stand to an extended and load carrying position in an arrangement such that the stand can be moved in a wheelbarrow-like fashion.

For an appreciation of background prior art, attention is directed to the following U.S. patents:
U.S. Pat. No. 2,674,130; Spychalla; Apr. 6, 1954
U.S. Pat. No. 3,941,002; Tucker, Jr.; Mar. 2, 1976
U.S. Pat. No. 2,844,342; Anderson; July 22, 1958
U.S. Pat. No. 2,993,740; Good; July 25, 1961
U.S. Pat. No. 1,832,410; Myers; Nov. 17, 1931
U.S. Pat. No. 947,454; Peckham; Jan. 25, 1910
U.S. Pat. No. 2,614,433; Cuckler; Oct. 21, 1962

Of incidental interest to such background is U.S. Pat. No. 3,404,884 which issued to Sorenson et al. on Oct. 8, 1968.

Various proposals have heretofore been made whereby a workstand can be given wheel support during movement of the stand, however, none of these proposals is believed to be entirely satisfactory for a number of reasons amongst which may be mentioned that the stand may be partially wheel supported at all times and thereby potentially unstable during utilization; lowering of wheels is inconvenient or requires stooping and/or effects nothing more than such lowering; movement along inclined surfaces can be hazardous; no enhanced mechanical advantage is realized beyond that obtained by grasping some fixed part of the stand; etc.

A paramount objective of the present invention is to provide a compact workstand that is of optimum stability during normal utilization, and which can, in a single convenient operation, be converted to a portable condition such as to be movable in a wheelbarrow-like fashion.

A further objective in accordance with that of the preceding paragraph is to provide such a stand wherein the conversion operation is effected by manipulation of handles during subsequent execution of wheelbarrow-like movements.

Another objective in accordance with the preceding objectives is that the handles afford an enhanced mechanical advantage over that which could be realized by merely grasping any other portion of the stand.

A final objective to be specifically set forth is to provide a stand in accordance with the preceding objectives wherein the wheel can be manually braked as desired by a user grasping the handles.

A broad aspect of the invention involves a portable workstand adapted for supporting power tools comprising an upstanding workstand having lowermost portions definitive of a horizontal plane and adapted to rest upon a supporting surface for supporting the workstand thereabove, said workstand having front and rear sides and also having a cavity therein, a wheel frame and a support wheel rotatably mounted thereon for rotation about a horizontal axis, means mounting said frame to said stand for movement between a retracted position in which the frame and the wheel are received in the cavity and an extended position in which the wheel extends from within the cavity to a position projecting below said horizontal plane, and actuating means operatively connecting the stand to the frame for actuating movement of the latter between its retracted and extended positions, said actuating means including a pair of actuating handles that move in planes normal to the axis of wheel rotation from retracted positions thereof closely spaced to the rear side of the stand to extended positions thereof relatively remotely spaced rearwardly from the rear side of the stand when the frame is moved from its retracted position to its extended position, and means for releasably retaining the handles in their extended positions, whereby the stand can be wheeled about in wheelbarrow fashion by use of the handles and the wheel when the frame is in extended position.

Other features, objectives and aspects of the invention will become apparent during the ensuing description of a preferred embodiment of the invention given in conjunction with the accompanying drawings; wherein:

FIG. 4 is a side elevational view of the stand with the same being in portable condition with the handles and wheel extended;

FIG. 5 is an enlarged fragmentary detail view of the bracket mounting and biasing structure, the same being taken from the plane indicated at 5—5 in FIG. 4; and, FIG. 6 is an enlarged fragmentary detail view illustrating the relationship of the wheel fork and the frame of the stand when the wheel is extended.

Figure 1:
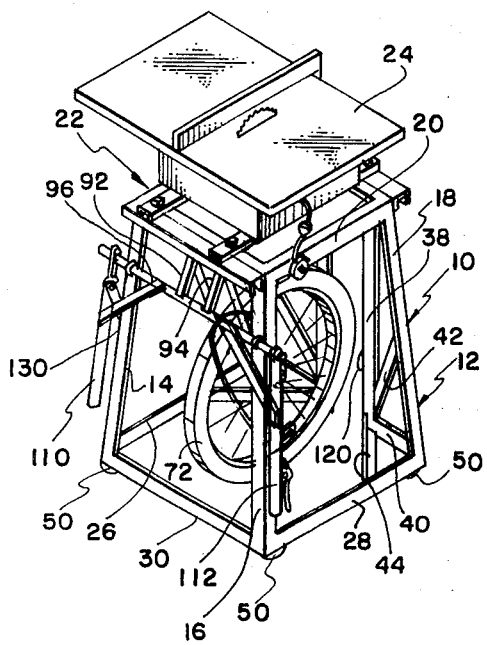
FIG. 1 is an isometric view of the workstand in its utilization condition with a power bench saw operatively mounted thereon.

Referring now to the drawings wherein like numerals designate like parts throughout the various views, the reference numeral 10 designates the portable workstand generally. The workstand 10 comprises a rigid frame structure 12, which is preferably of welded steel construction. If desired, or deemed expedient, such as for compact shipment of its components prior to assembly, the same can be assembled by bolts or rivets. Indeed, the frame can be of hardwood construction. The frame 12 includes a pair of upstanding rear legs 14 and 16 and a pair of front legs 18, the upper ends of the legs 14, 16 and 18 being rigidly joined to an open square frame 20. The frame 20 constitutes the top of the stand 10 and is provided with conventional mounting means 22 for detachably mounting power tools, such as the illustrated bench saw 24, on top of the stand 10.

The rigid frame 12 of the stand 10 also includes horizontal members 26 and 28 connecting the lower ends of the legs 14 and 16, respectively, to the lower ends of the legs 18. A member 30 connects the lower ends of the rear legs 14 and 16, as shown.

As thus far described, it will be appreciated that the frame 12 of the stand 10 is hollow so that it may be considered as having a cavity therein that opens downwardly from the bottom of the stand between the frame members 26 and 28. Such cavity also opens centrally to the front of the stand 10 through an opening defined between a pair of parallel frame members 36 and 38 which have their upper ends fixed to the front side of the frame 20 and their lower ends connected to the lower ends of the legs 18 by short identical horizontal frame members 40, only one of which is plainly shown in FIG. 1. The lower ends of the frame members 36 and 38 are rigidly braced in identical fashions. As clearly shown in FIG. 1, the juncture of the frame members 38 and 40 is braced to the leg 18 and the horizontal frame member 28, respectively, by braces 42 and 44.

As clearly shown in FIG. 1, the frame 12 of the stand is of a square overall configuration in the horizontal plane and tapers upwardly with the frame members 36 and 38 being coplanar with the front legs 18. The lower ends of the legs 14, 16 and 18 are provided with depending rubber feet or pads 50. Each of the feet 50 is connected to the frame 12 in a conventional vertically adjustable fashion such as shown in FIG. 4 with respect to one of such feet, wherein it is shown that such foot 50 includes an upstanding threaded projection 52 that is threadingly received through an opening in the frame 12. As will be understood, the adjustability of the feet 50 allows compensation to be made for any irregularities in a supporting surface so that all four feet bear against the surface and support the stand 10 stably. Indeed, the legs can be adjusted to level the top thereof if desired.

Inasmuch as the stand 10 will probably find its greatest use in connection with electrically powered tools such as bench saw, grinders, sanders, planers and the like, conventional electric supply means 56 are provided for convenience which can include an of-off switch box 58 mounted on the frame 12. An electric power cord with plug 60 is provided for connecting the switch 58 to electric mains at convenience outlets, not shown. The switch 58 is provided with an electric coupling device 62 by means of which electrical energy can be supplied to the saw 24 via the power cord 64 of the latter.

The stand 10 includes means designated generally at 70 for making the same manually portable. The means 70 comprises a ground support wheel 72 that preferably includes a pneumatic tire 74. The wheel 72 is of sufficient size as to roll readily over rough ground such as encountered at construction sites, and over boards, and the like, as may be lying about in a shop. The wheel 72 is normally disposed in its entirety within the cavity or hollow interior of the frame 12 so as to be horizontally circumscribed by the latter.

The wheel 72 is mounted for rotation between the lower ends of spaced legs 80 and 82 of a fork 84. The fork includes cross members 86 and 88 rigidly joining, preferably by welding, the legs 80 and 82.

The upper ends of the fork legs 80 and 82 are pivotally connected by an elongated pivot pin 90 to the free ends of a spaced pair of arms 92 and 94 that are in turn rigidly fixed to a horizontal shaft 96. The shaft 96 rotatably extends through steel loops 98 and 100 that are fixed to the rear sides of the rear legs 14 and 16. The axis of the shaft 96, the pivot pin 90 and the wheel 72 are parallel to each other. The extremities of the pivot pin 90 are upset or otherwise provided with enlargments to prevent inadvertent displacement of the same.

Figure 3:
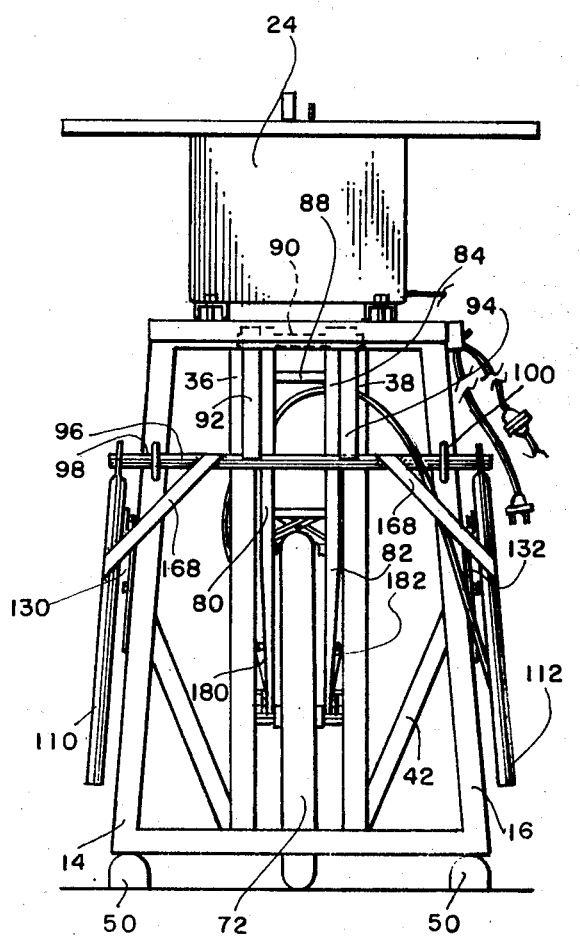
FIG. 3 is a rear elevational view of the stand in utilization condition with hidden details being shown in dashed outline.

A pair of handles 110 and 112 are fixedly secured to the shaft 96 adjacent its opposite ends as shown in FIG. 3.

The relationship of the parts thus far described is such that when the wheel 72 is in its retracted position shown in FIG. 3, such wheel is disposed within the stand and rests upon the stand supporting surface 114, and the arms extend upwardly and forwardly with the pivot pin 90 being adjacent the top of the stand 10. Also the handles depend or hang downwardly from the shaft 96 in approximate parallelism with the rear legs 14 and 16 as clearly shown in FIGS. 1, 2 and 3. It will also be noted that the pivot pin 90 is disposed rearwardly of the axis 116 of the wheel 72.

Figure 2:
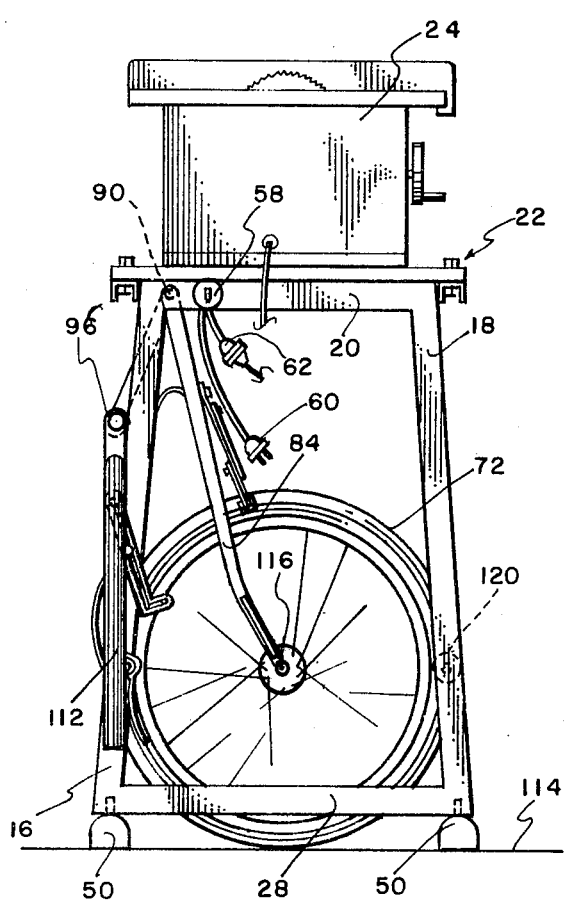
FIG. 2 is a side elevational view of the stand in utilization condition with hidden details being shown in dashed outline.

The arrangement is such that clockwise rotation of the shaft 96 as viewed in FIG. 2 (as may be caused by moving the lower ends of the handles 110 and 112 upwardly and rearwardly) will cause forward and downward movement of the pivot pin 90 which acts upon the fork 84 to move the wheel 72 forwardly as the latter rolls upon the surface 114. As such movement is continued past the point that the axis 116 passes between the vertical frame members 36 and 38, the lower end portions of the fork legs 80 and 82 pass beneath rollers 120 mounted upon facing sides of the frame members 36 and 38. Inasmuch as the fork legs 80 and 82 are forwardly and downwardly inclined, further continuation of the described movement causes a coaction between such legs and the rollers 120 so as to cam or force the wheel axis 116 downward relative to the frame 12 as the rollers roll upon the legs as best shown in FIG. 6 in relation to the fork leg 80.

Means are provided for limiting clockwise movement of the shaft 96 to the position shown thereof in FIG. 4 wherein the handles 110 and 112 project or extend rearwardly and approximately horizontally from the rear legs 14 and 16 and wherein the wheel 72 has its lowermost portion 126 disposed in a position spaced below the plane defined by the bottom of the feet 50 and forwardly of the forwardmost pair of feet 50. Assuming for the moment that the shaft 96 is fixed against rotation, the stand 10 can be allowed to rest stably upon the surface 114 with the wheel 72 and the rearmost feet 50 contacting the same.

The means for limiting clockwise movement of the shaft comprises a pair of slotted brackets 130 and 132 pivoted respectively to the handles 110 and 112, with headed projections or pins fixed respectively to the legs 14 and 16 being received through the slotted brackets. The bracket 132 is best shown, and since the brackets 130 and 132 are identical, a detailed description of the bracket 132 will suffice for both.

As best shown in FIG. 5, the bracket 132 is pivotally secured to the handle 112 by means of the bolt 136 carried by the handle 12, the bracket 132 being retained on the bolt by means of a nut 138 threaded on the bolt 136. A spring 140 is coiled about the bolt 136 intermediate the bracket 132 and the handle 112, and such spring has its opposite ends 142 and 144 in engagement with the handle 112 and the bracket 132, respectively, so as to urge clockwise swinging movement of the bracket 132 about the bolt 136 relative to the handle 112 as viewed in FIG. 4 for a purpose presently to become evident. A headed projection or pin 150 fixed to the leg 116 is slidingly received within an L-shaped slot 152 in the bracket 132. The arrangement is such that the length of the slot 152 limits clockwise movement about the axis of the shaft 96 as viewed in FIG. 4 to the position shown thereof in such figure. As mentioned previously, the slot 152 is L-shaped and includes a portion 160 at right angles to the major extent of the slot 152, and is such that the pin 150 is received in the same upon the handle 112 reaching its upper limiting position by action of the spring 142, it being noted that such action of the spring 140 is augmented gravitationally as the center of gravity of the bracket 132 is disposed so as to urge clockwise swinging of the bracket 132 about its pivot 136.

It will be evident to those skilled in the art that when the bracket 132 is disposed so that the pin 150 is disposed within the slot portion 160, the handle 112 is not only denied further upward swinging movement about the axis of the shaft 96, but is also prevented from downward swinging movement. The arrangement is such that when it is desired to return the handles 110 and 112 to their retracted and depending positions shown in FIGS. 1 through 3, the user must manually swing the brackets 130 and 132 against gravitational force and the action of the springs 140 to free the pins 150 from the slot portions 160, whereupon the handles 110 and 112 can be lowered.

While the brackets have been described as identical, such is not necessary, and indeed it may be preferable that only one of such brackets have an L-shaped slot (using only a straight slot) and have associated spring means as will be evident to those skilled in the art. When so simplified, only one bracket need be manually released in order to lower the handles.

In the preferred construction, the handles 110 and 112 are reinforced by diagonal braces 168 connecting such handles to the shaft 96 as best shown in FIGS. 1 and 3.

In order to afford lateral stability to the wheel 72 as the latter is subjected to its load carrying function, and in particular to limit lateral movement of the wheel 72 relative to the frame 12, a pair of tapered wedges 180 and 182 are fixed to the opposite or outer sides of the fork legs 80 and 82, respectively. It will be noted on reference to FIG. 6 that such wedges or cams 180 and 182 are fixed to the fork legs 80 and 82 adjacent the free ends of the latter and are disposed so as to be between the frame members 36 and 38 when the stand 10 is in the portable condition shown thereof in FIG. 4. The remote outer surfaces of the wedges 180 and 182 are rearwardly and upwardly divergent and have a spacing that they closely approach and cammingly urge the wheel 72 into a centered position between the frame members 36 and 38 as the wheel 72 approaches the position shown thereof in FIG. 4 in consequence of raising of the handles 110 and 112. The relationship is such that the wedges or cams 180 and 182 coact with the frame members 36 and 38 to cause a centering of the wheel 72 as it is extended and to closely limit lateral movement of the wheel 72 from its centered position where the latter has been fully extended.

As thus far described, the operation of use of the stand 10 will be readily understood. When use is to be made of the power tool 24, the handles 110 and 116 are disposed as shown in FIGS. 1 through 3 and the wheel 72 is retracted within the hollow or cavity within the frame 12. At this time, all four feet 50 rest upon the surface 114. Also, the wheel 72 contacts the surface 114 when it is desired to move the stand 10 to another location, the lower ends of the handles 110 and 112 are swung rearwardly and upwardly to their limiting positions and such causes the wheel 70 to roll forwardly upon the surface 114 while being cammed downwardly by the rollers 120 as well as being cammed to a centered position by the wedges 180 and 182.

The mechanical advantage realized in downward camming of the wheel 72 is such that the handles 110 and 112 can be raised to their limited positions shown in FIG. 4 with the rear feet 50 remaining in supporting engagement with the surface 114. In other words, only the front feet 50 are raised so as to obtain the three-point support of the two rear feet 50 and the wheel 72. After the handles 110 and 112 have been raised to their limited positions and the three-point support has been realized, the handles 110 and 112 can be lifted further so as to raise the two rear feet 50 from the surface 114 as shown in FIG. 4, whereupon the stand 10 can be moved about in a wheelbarrow fashion with the user grasping the two handles 110 and 112 in his two hands and the bulk of the weight of the stand 10 being carried by the rolling wheel 72.

In the preferred construction so as to afford greater safety and control over movement of the tool 10 over inclined surfaces such as when loading or unloading the stand 10 from a truck on an inclined ramp, not shown, brake means are provided whereby the user can brake the wheel 72 without releasing the handles 110 and 112 from his grasp. Such brake means are designated generally at 190 and are of the same general character as the handgrip brake means provided on conventional bicycles. The brake means comprises a clamping type brake shoe structure 192 mounted upon the fork 84 by brackets 194. The brake structure or mechanism 192 is of the conventional caliper type commonly used on bicycles which will upon actuation forcibly urge brake shoes against opposite sides of the wheel rim 196, with such actuation being effected by means of a conventional steel cable and flexible casing therefor 198. The flexible cable 198 extends upwardly and rearwardly from its connection to the brake shoe mechanism 192, above the pivot pin 90, and over the shaft 96 and is connected to a handle or lever 200 pivotally mounted at 202 on the handle 112. The operation of the conventional brake means 190 mounted as described is such that the user can grip the handle or lever 200 towards the handle 112 to effect a braking of the wheel 72, and can release such braking on relaxing his grip on the handle 200.

Having now fully described my invention and its operation, attention is now directed to the appended claims in order to ascertain the actual scope of the invention.

I claim:

1. A portable workstand adapted for supporting power tools comprising an upstanding workstand having lowermost portions definitive of a horizontal plane and adapted to rest upon a supporting surface for supporting the workstand thereabove, said workstand having front and rear sides and also having a cavity therein, a wheel frame and support wheel rotatably mounted thereon for rotation about a horizontal axis, means mounting said frame to said stand for movement between a retracted position in which the frame and the wheel are received in the cavity and an extended position in which the wheel extends from within the cavity to a position projecting below said horizontal plane, and means for actuating movement of the latter between its retracted and extended positions, said actuating means comprising a pair of actuating handles operatively connected to the frame and pivotally mounted on the rear side of the workstand for limited pivotal movement about a horizontal transverse axis and which handles move from retracted positions thereof in which they are closely spaced to the rear side of the stand and depend from the transverse axis to extended positions thereof in which they extend rearwardly from the rear side of the stand when the frame is moved from its retracted position to its extended position, and means for releasably retaining the handles in their positions, whereby the stand can be wheeled about in wheelbarrow fashion by use of the handles and the wheel when the frame is in extended position.

2. The combination of claim 1 together with manually controlled brake means for braking rotation of the wheel, with said brake means including a manually actuable control lever mounted on one of the handles.

3. The combination of claim 1, wherein said cavity opens downwardly through said horizontal plane.

4. The combination of claim 1, wherein said cavity opens both downwardly through said horizontal plane and through the front side of the stand, and wherein said wheel projects downwardly and forwardly from the stand when the frame is in its extended position.

5. The combination of claim 1, wherein the wheel is disposed entirely within the cavity when the frame is in its retracted position.

6. The combination of claim 1, wherein said frame is bifurcated and includes a pair of legs between which the wheel is disposed, said actuating means comprising a horizontal shaft mounted for rotation on the rear side of the stand, an arm having one end fixed to the shaft and a second end remote from the shaft pivotally connected to the frame, and said handles being fixed to the shaft for rotating the latter, and cam means mounted on the stand and engageable with the frame legs during movement of the frame from its retracted position to cammingly urge the legs downwardly as the frame moves to its extended position.

7. The combination of claim 6, wherein said cam means comprises a pair of rollers mounted on the stand.

8. The combination of claim 6, wherein said stand includes a pair of spaced upright members defining a forward extremity of the cavity, and wheel centering means comprising said legs having relatively tapered remote side surfaces that cammingly engage adjacent surfaces of the members to urge the frame and the wheel toward a central position between the members when the frame is moved toward its extended position.

9. The combination of claim 8, wherein said cam means comprises a pair of rollers mounted on said members.

10. The combination of claim 1, wherein said means for releasably retaining the handles in their extended positions comprises an elongated bracket having a slot therein, said bracket connecting one of the handles to the stand, with the bracket being pivoted at an end thereof to one of the latter and receiving a pin carried by the other through its slot, said slot being L-shaped and including a relatively long portion extending along the length of the bracket that terminates in a relatively short portion at about right angles thereto, and said pin being received at a position in the short portion of the slot out of alignment with the long slot portion when the handle is in its extended position, the arrangement being such that the bracket retains the handle in its extended position until the bracket is pivotally moved to align the pin with the long slot portion.

11. A portable workstand adapted for supporting power tools comprising an upstanding workstand having lowermost portions definitive of a horizontal plane and adapted to rest stably upon a floor, said workstand having front and rear sides, a pair of laterally spaced and elongated handles each having an inner end and a free end, with the inner ends of the handles being pivotally secured to the workstand for rearward and upwardly limited pivotal movement of the free ends of the handles about a transverse horizontal axis between a retracted position such that the handles extend downwardly from the transverse axis adjacent the rear side of the workstand and an extended and relatively elevated position such that the handles extend rearwardly from the rear side of the workstand, means for releasably securing the handles in extended position thereof, support wheel means mounted on the workstand for movement between elevated and lowered positions relative thereto, said wheel means including a support wheel having a lower periphery that is respectively at least of the height and below said plane when the wheel means is in its elevated and lowered positions, with said wheel being rotatable about an axis parallel to and forward of the rear side of the workstand when the support means is in its lowered position, and means operatively connecting the handles to the support wheel means for movement of the latter from its elevated position to its lowered position as the handles are pivotally moved from their retracted position to their extended position and vice versa, whereby a user can grasp the free ends of the handles when in their retracted position and effect the lowering of the support wheel to cause the latter to lend support to the workstand at a location forward of the rear side of the workstand by pivotally swinging the handles to their rearwardly extending position, thereby enabling the user the maneuver of the workstand in a wheelbarrow-like manner on securing the handles in their rearwardly extending position.

12. The combination of claim 11, together with means for braking rotation of the support wheel, means, inclusive of a manually actuable control element mounted on one of the handles adjacent its free end, for controlling operation of the braking means.

* * * * *